(12) United States Patent
Howard et al.

(10) Patent No.: US 9,200,688 B2
(45) Date of Patent: Dec. 1, 2015

(54) VEHICLE BRAKE ASSEMBLY

(71) Applicant: Meritor Heavy Vehicle Braking Systems (UK) Limited, Cwmbran, Gwent (GB)

(72) Inventors: Alexander Howard, Gwent (GB); Yahia Abdel-Fattah, Gwent (GB); Brian Wiggins, Gwent (GB)

(73) Assignee: Meritor Heavy Vehicle Braking Systems (UK)Limited, Cwmbran, Gwent (GB)

( * ) Notice: Subject to any disclaimer, the term of this patent is extended or adjusted under 35 U.S.C. 154(b) by 81 days.

(21) Appl. No.: 14/132,736

(22) Filed: Dec. 18, 2013

(65) Prior Publication Data

US 2014/0166412 A1    Jun. 19, 2014

(30) Foreign Application Priority Data

Dec. 19, 2012 (EP) .................... 12197958

(51) Int. Cl.
| | |
|---|---|
| *F16D 65/58* | (2006.01) |
| *B60T 1/06* | (2006.01) |
| *F16D 65/68* | (2006.01) |
| *F16D 55/2255* | (2006.01) |
| *F16D 65/18* | (2006.01) |
| *F16D 65/56* | (2006.01) |
| *F16D 55/00* | (2006.01) |

(52) U.S. Cl.
CPC ................. *F16D 65/58* (2013.01); *B60T 1/065* (2013.01); *F16D 55/2255* (2013.01); *F16D 65/183* (2013.01); *F16D 65/568* (2013.01); *F16D 65/68* (2013.01); *F16D 2055/0037* (2013.01); *Y10T 29/49904* (2015.01)

(58) Field of Classification Search
CPC ........... B60T 1/06; F16D 65/40; F16D 65/00; F16D 55/02; F16D 55/226; F16D 65/0075
USPC ...................... 188/71.1, 71.4, 71.7, 72.1, 72.4
See application file for complete search history.

(56) References Cited

U.S. PATENT DOCUMENTS

| | | | |
|---|---|---|---|
| 2012/0034430 A1* | 2/2012 | Nelson et al. ............... | 428/195.1 |
| 2012/0325595 A1* | 12/2012 | Malki et al. .................. | 188/71.7 |
| 2013/0240305 A1* | 9/2013 | Thomas et al. .............. | 188/72.4 |

FOREIGN PATENT DOCUMENTS

| | | |
|---|---|---|
| DE | 102006003746 A1 | 8/2007 |
| DE | 102009023104 A1 | 12/2009 |

(Continued)

OTHER PUBLICATIONS

European Patent Office, Extended Search Report for the corresponding European Patent Application No. EP 12197958.7 mailed Jun. 6, 2013.

*Primary Examiner* — Melanie Torres Williams
(74) *Attorney, Agent, or Firm* — Brooks Kushman P.C.

(57) ABSTRACT

A vehicle brake assembly including a brake caliper defining a caliper housing and defining a plane of rotation of a brake disc, the housing having an opening facing the plane of rotation of a brake disc, a cover plate for closing the opening and an actuator assembly at least partially mounted in the housing, wherein the actuator assembly includes at least one piston for moving a friction element into contact with a brake disc, an adjuster mechanism for adjusting the effective length of the at least one piston, the adjuster mechanism including an adjuster shaft, the adjuster shaft being fixed to the cover plate by a spring clip arrangement.

11 Claims, 14 Drawing Sheets

(56) References Cited

FOREIGN PATENT DOCUMENTS

| | | | |
|---|---|---|---|
| EP | 2514989 | A1 | 10/2012 |
| EP | 2538105 | A2 | 12/2012 |
| FR | 2506414 | A1 | 11/1982 |
| WO | 2008072742 | A1 | 6/2008 |

* cited by examiner

VEHICLE BRAKE ASSEMBLY

TECHNICAL FIELD

The present invention relates to a vehicle brake assembly. More specifically, but not exclusively, the present invention relates to an adjuster mechanism for air actuated disc brakes of the type typically used on heavy vehicles such as trucks and buses.

BACKGROUND

Actuator assemblies of disc brakes, particularly air actuated disc brakes, are mounted within a caliper of the brake and transmit the actuation force from an air actuator to friction elements of the brake via tappets or pistons. Typically actuator assemblies also incorporate an adjuster mechanism to compensate for wear of the friction elements in use.

EP2538105 shows a prior art vehicle brake assembly. However, this vehicle brake assembly includes many components, all of which need assembling together. Certain components are assembled into the housing and assembly can be time consuming.

The present invention seeks to overcome or at least mitigate the problems of the prior art.

SUMMARY

According to the present invention there is provided a vehicle brake assembly including a brake caliper defining a caliper housing and defining a plane of rotation of a brake disc, the housing having an opening facing the plane of rotation of a brake disc, a cover plate for closing the opening and an actuator assembly at least partially mounted in the housing, wherein the actuator assembly includes at least one piston for moving a friction element into contact with a brake disc, an adjuster mechanism for adjusting the effective length of the at least one piston, the adjuster mechanism including an adjuster shaft, the adjuster shaft being fixed to the cover plate by a clip arrangement.

The clip arrangement may be a spring clip arrangement.
The clip arrangement may not be a spring clip arrangement.

A further aspect of the present invention provides a method of assembling a vehicle brake assembly including
- providing a brake caliper defining a caliper housing and defining a plane of rotation of a brake disc, the housing having an opening facing the plane of rotation of a brake disc,
- providing a cover plate for closing the opening,
- providing at least one piston for moving a friction element into contact with a brake disc,
- providing an adjuster mechanism for adjusting an effective length of the at least one piston, the adjuster mechanism including an adjuster shaft,
- providing a clip arrangement,
- providing a bias device,
- providing a sub assembly by fixing the adjuster mechanism to the cover plate via the clip arrangement such that the bias device biases the adjuster shaft away from the cover plate and the adjuster shaft is prevented from moving away from the cover plate by the clip arrangement and attaching the at least one piston to the cover plate, the at least one piston and the adjuster mechanism at least partially defining an actuator arrangement,
- the subassembly being provided remotely from the caliper housing,
- subsequently assembling the subassembly to the caliper housing such that the actuator arrangement is at least partially mounted in the housing and the opening is closed by the cover plate and the cover plate is secured to the housing.

The clip arrangement may be a spring clip arrangement.
The clip arrangement may not be a spring clip arrangement.

BRIEF DESCRIPTION OF THE DRAWINGS

Embodiments of the present invention will now be described in detail with reference to the accompanying figures in which.

DETAILED DESCRIPTION

As required, detailed embodiments of the present invention are disclosed herein; however, it is to be understood that the disclosed embodiments are merely exemplary of the invention that may be embodied in various and alternative forms. The figures are not necessarily to scale; some features may be exaggerated or minimized to show details of particular components. Therefore, specific structural and functional details disclosed herein are not to be interpreted as limiting, but merely as a representative basis for teaching one skilled in the art to variously employ the present invention.

Figure 1:
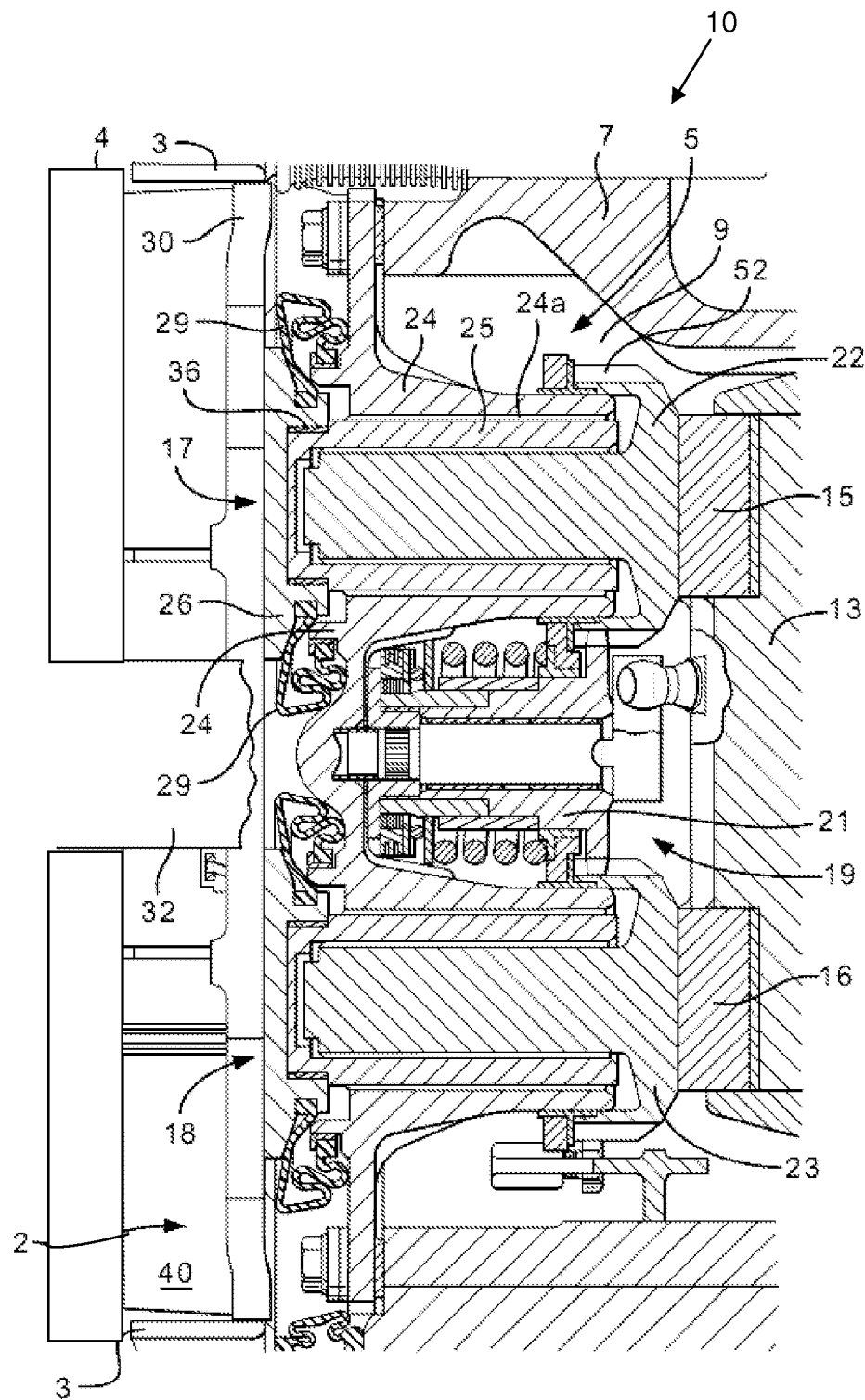
FIG. 1 is a horizontal cross-sectional view through a portion of a prior art disc brake incorporating a prior art force transmission device (or actuator assembly)

A prior art force transmission device 5 is illustrated in FIG. 1. Briefly, the device is mounted within a chamber 9 of a housing 7 of a disc brake caliper 10. The housing 7 is adapted to mount a conventional air or other power actuator—e.g. an electromechanical actuator (not shown) on an external face thereof. An actuating lever (not shown) may perform an angular reciprocal swinging movement under the action of a thrust member of the power actuator, the lever being integral or attached to a rotary actuating member 13 (commonly referred to as an operating shaft) which is rotatably supported within the caliper. The member 13 is recessed to house respective cylindrical rollers 15, 16, the axes of which are offset from the rotary axis of the actuating member 13 and form an eccentric actuating arrangement. The rollers 15 and 16 bear against respective thrust assemblies, shown as adjustable piston assemblies, and indicated generally at 17 and 18 of the force transmission device 5.

Rotation of the lever and its connected member 13 causes actuating thrust to be applied via piston assemblies 17 and 18 to a directly actuated friction element 2 and, by reaction via the caliper 10, to an indirectly actuated friction element (not shown). The friction elements are mounted so as to face respective sides of a brake disc or rotor 4. The friction elements are received within openings in a brake carrier 3 fixed to a non-rotatable portion of a vehicle (e.g. the axle) to which the brake is mounted. The friction elements are thus restrained from circumferential and radial inward movement. Radial outward movement is restricted by pad springs 30 and a pad strap 32, as is well known.

An adjuster assembly is indicated generally at 19 and may be of any appropriate conventional type needing no detailed description. The adjuster responds to excessive movement of the friction element 2 (e.g. due to wear of friction material 40 in use) and produces resultant rotation of an adjuster shaft 21 via gear 52 which in turn rotates a pair of inner tappets 22 and 23 of the adjustable piston assemblies 17 and 18.

The piston assemblies 17 and 18 are of identical construction and operation. Thus only assembly 17 is described in greater detail. This assembly comprises a piston housing 24 comprising a trilobular bush 24a. A piston head 26 is mounted to a closed end portion of a piston shaft 25 having a trilobular external surface which is received in the bush 24a so as to be axially guided by the bush. The piston shaft 25 further has a threaded internal bore arranged to receive the inner tappet 22 having a corresponding external thread. The piston assemblies 17 and 18 are disposed with tappet heads 26 thereof adjacent to the friction element 2.

When force is applied by the brake actuator from the right in FIG. 1, the entire piston assembly slides along bore 24a to transmit the braking force to the friction element 2 via piston head 26. To adjust the length of the piston assembly 17, inner tappet 22 is rotated so as to cause relative axial movement between the inner tappet and the piston shaft 25 by virtue of the action of their mating threads. The trilobular configuration of the outer surface of the piston shaft 25 within the bush 24a prevents rotation of the piston shaft 25 relative to the housing 24, thereby ensuring that rotation of inner tappet 22 results in actual lengthening of the piston assembly 17.

In order to prevent the ingress of particles of dirt and debris into the sliding interface between the trilobular outer surface of the piston shaft 25 and bore 24A. A primary seal 29 is provided between the piston head 26 and housing 24.

Referring to FIGS. 2, 3, 4 and 7 a force transmission device 105 forms part of a vehicle brake assembly 100 according to an embodiment of the present invention is shown. Like parts are illustrated by like numerals, but with the addition of the prefix "1". Only those parts that differ from the prior art of FIG. 1 are discussed in detail. Specifically, the rotor, friction elements, pad springs, pad strap, brake carrier and housing of the brake into which the force transmission device of the present invention are to be fitted are conventional. The general operation of the brake is similar, although the detail of a number of components differs as detailed below in significant ways.

The force transmission device 105 comprises two identical piston assemblies 117 and 118 mounted within a yoke 124. The yoke 124 differs from the piston housing of the prior art of FIG. 1 in that it does not function as a cover plate to close off a rotor side opening 108 of housing 107, and is additionally movable parallel to axis A-A towards and away from the rotor together with the piston assemblies 117 and 118 during brake application and release. A separate pressed steel cover plate 128 closes off the opening 108, and is discussed in more detail below.

A resilient return element in the form of a helical return spring 142 is mounted between the cover plate 128 and a circular recess 144 of the yoke 124. The spring provides a force to return the piston assemblies and rotary actuating member to a brake-off position when the power actuator is released. The recess surrounds an aperture 146 arranged to accommodate an adjuster assembly 119.

The yoke 124 additionally comprises vertical and horizontal sliding surfaces 148 arranged to contact corresponding surfaces of the housing 107 or further components to guide the motion of the force transmission device 105. In particular, in this embodiment, one side of the yoke 124 is supported on a portion 192 of a de-adjuster mechanism 190. In other embodiments alternative profiled surfaces may locate and guide the yoke 124 in multiple axles.

As the yoke is not required to transmit the brake thrust from the rotary actuating member to the pistons, and because it is enclosed within the housing, it is not necessary for it to be a high strength or particularly corrosion resistant component. Therefore is may conveniently manufactured from lower strength materials such as aluminium or engineering plastics such as ABS or high molecular weight polyethylene using lower cost, higher volume processes such as die casting, extrusion, sintering or injection moulding. Alternatively, the yoke may be constructed as a multi-component assembly, comprising e.g. extruded aluminium guide blocks for each piston joined by a pressed steel connector that engages the return spring.

The yoke 124 acts as a guide member for the piston assemblies 117 and 118 and includes a generally cylindrical guide form 154 located either side of the aperture 146 to receive each piston assembly. In this embodiment the guide forms do not require a separate bush. This is due to the fact that the yoke moves in unison with the piston assemblies during brake application and release, and there is only relative motion therebetween during wear adjustment, meaning there is less risk of wear occurring and bushes are not needed.

However, for adjustment of the length of the assemblies 117 and 118 to be achieved, it remains necessary for rotation of the pistons to be prevented. Thus, an anti-rotation formation is provided which includes first and second radially inward facing opposing slots 156 that extend parallel to axis A-A along the full length of forms 154.

The piston shafts 125 have a substantially cylindrical radially outer surface 127, but at an inboard end (the end closest the rotary actuating member) comprise opposing radial projections 158 arranged to be a complementary fit with the slots 156 so that the shafts may move freely along the length of the forms 154, but not rotate. In order to fully accommodate for the wear of friction material, the length of the slots 156 should be equal or greater than the depth of friction material on both friction elements added together. It will be readily appreciated that in other embodiments only a single slot and projection may be needed, or more slots and projections provided. The shape and size of the slots and projections may be altered, e.g. to be rounded, triangular etc.

The piston shafts 125 are hollow and have an internal thread 160. An inner tappet 123 is provided for both pistons and comprises a shaft 123a with external threads 162 that mesh with the internal threads 160. As a consequence, rotation of the inner tappet 123 causes extension of the piston assemblies 117 and 118 to account for wear of the friction elements and maintain a substantially constant running clearance.

The tappet assemblies 117 and 118 are adjusted by adjuster assembly 119 located intermediate to the tappet assemblies and in driving connection thereto via gears 152 at the inboard ends of the inner tappets 123.

In this embodiment the inner tappets 123 are constructed from two distinct pieces. The shaft portion 123a that transmits a thrust loading from the rollers 115 of the rotary actuating member 113 to the piston 125 forms one piece. The second piece 123b incorporates the gear 152 for transmission of rotary motion to the shaft 123a. In other embodiments a conventional one piece inner tappet may be used.

The shaft portion 123a is required to withstand a considerable axial load over a relatively small area from rollers 115 and 116, and also needs accurate machining of the threads 162. Therefore, the shaft portion 123a needs to be a high strength component, such as a steel forging, and may require additional treatment, such as induction hardening of its inboard surface in contact with the roller. In other embodiments the shaft may be a cast metal such as cast steel.

The second gear portion 123b may be formed from a relatively lower strength material than the shaft 123a, since the loads it sees in service are considerably lower only; the rotational drive from the adjuster assembly 119 and the return force from the spring 142.

In some embodiments the two portions may be bonded together by e.g. welding or adhesive, but in a preferred embodiment this is not needed, due to the shape of the two components. In this embodiment the shaft portion 123a and the gear portion 123b comprise complementary abutting surfaces in a direction transverse the axis A-A, specifically an enlarged head 164 on the inboard end of the shaft portion, and a corresponding annular recess 166 on the inboard end of the gear portion 123b.

This arrangement restrains movement of the shaft toward an inboard end of the actuating member at which the actuating member is located. Since the return spring effectively acts on the gear portion 123b via an abutment surface 168 of the yoke 124, this means the gear is urged into contact with the head 164 at all times.

The shaft portion 123a and the gear portion additionally comprise complementary abutting surfaces in a circumferential direction so as to restrict relative rotation of the gear with respect to the shaft. In this embodiment, these surfaces are in the form of complementary castellations 170 and 172 on the shaft portion 123a and gear portion 123b respectively.

Figure 6:
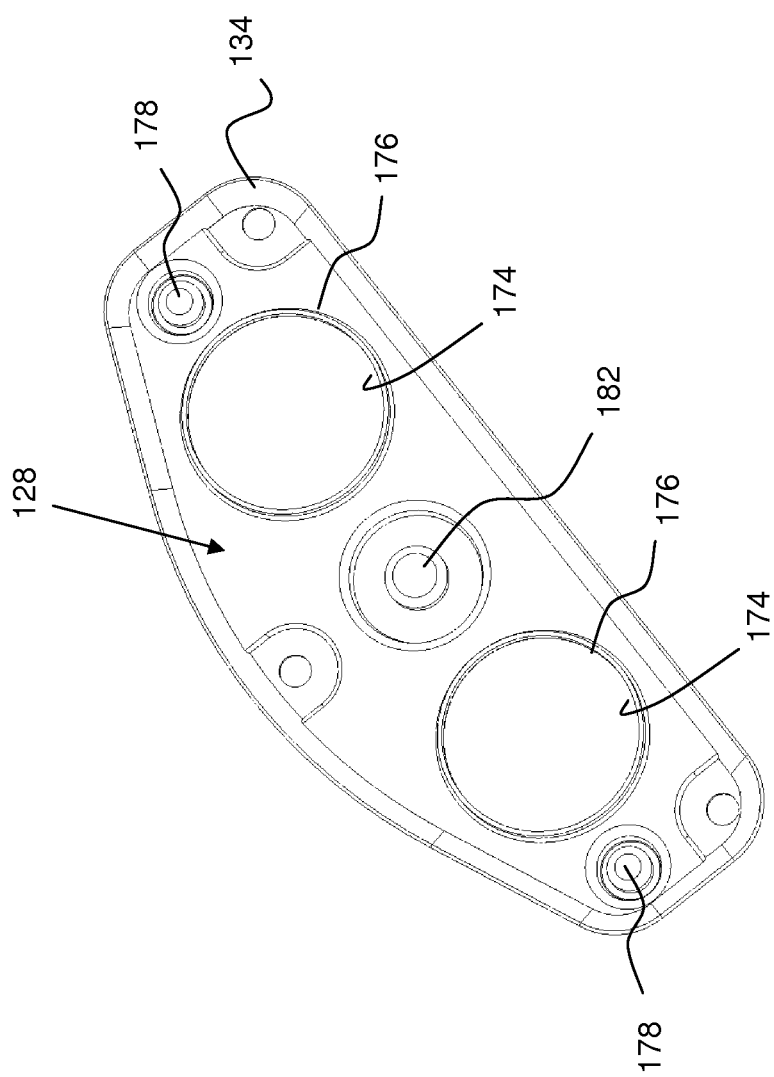
FIG. 6 is a perspective view of a cover plate of the present invention.
Figure 7:
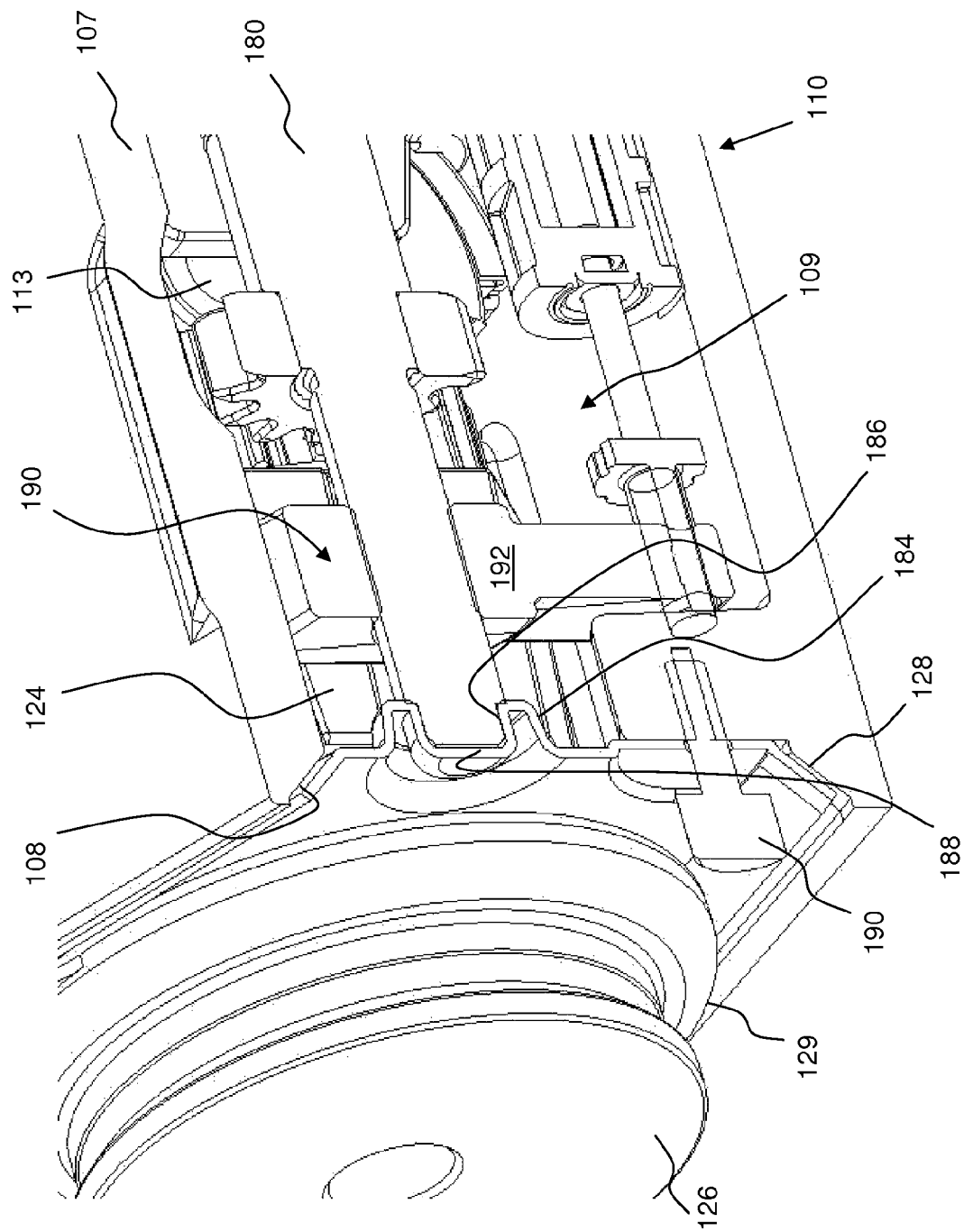
FIG. 7 is a vertical cross-sectional view of a brake caliper incorporating a cover plate of FIG. 6.

With reference in particular to FIGS. 6 and 7 it can be seen that the cover plate 128 is mounted over a rotor side (outboard) opening 108 in the housing 107 of the brake caliper 110. The cover plate has two apertures 174 therein through which the piston assemblies 117 and 118 extend and thereby are able move a friction element into contact with a brake rotor. The apertures are provide with peripheral lips 176 extending outboard.

In this embodiment the cover plate 128 is a pressed sheet metal component, preferably sheet steel with a suitable corrosion resistant coating such as an epoxy coating, zinc passivated coating or stainless steel. The plate 128 is preferably stamped from steel sheet having a thickness of 1.5-2 mm. In other embodiments the cover plate may be forged or cast.

By forming the cover plate as a pressing, it is possible to provide journal bearing forms therein to support rotating shafts of components mounted within the caliper housing 107 as part of the pressing process. These bearing forms are plain bearings, in this embodiment, and since the amount of rotation of the shafts that the bearings support is not substantial, wear thereof during the life of the brake is not significant. In other embodiments, it is nevertheless possible to provide a bushing on the bearing form.

In this embodiment the bearing forms 178 and 182 comprise a substantially circular wall 184 extending away from a major plane of the cover plate and a second circular wall 186 extending back towards the major plane and terminating in an end wall 188 to form a blind substantially cylindrical bore.

Bearing forms 178 are used in this embodiment to mount a shaft 180 of a manual brake de-adjuster mechanism as best seen in FIG. 7. The de-adjuster mechanism is used to rewind the piston assemblies before fitting new friction elements, and as such is only rotated once every few months or even years in normal service.

Figure 8:
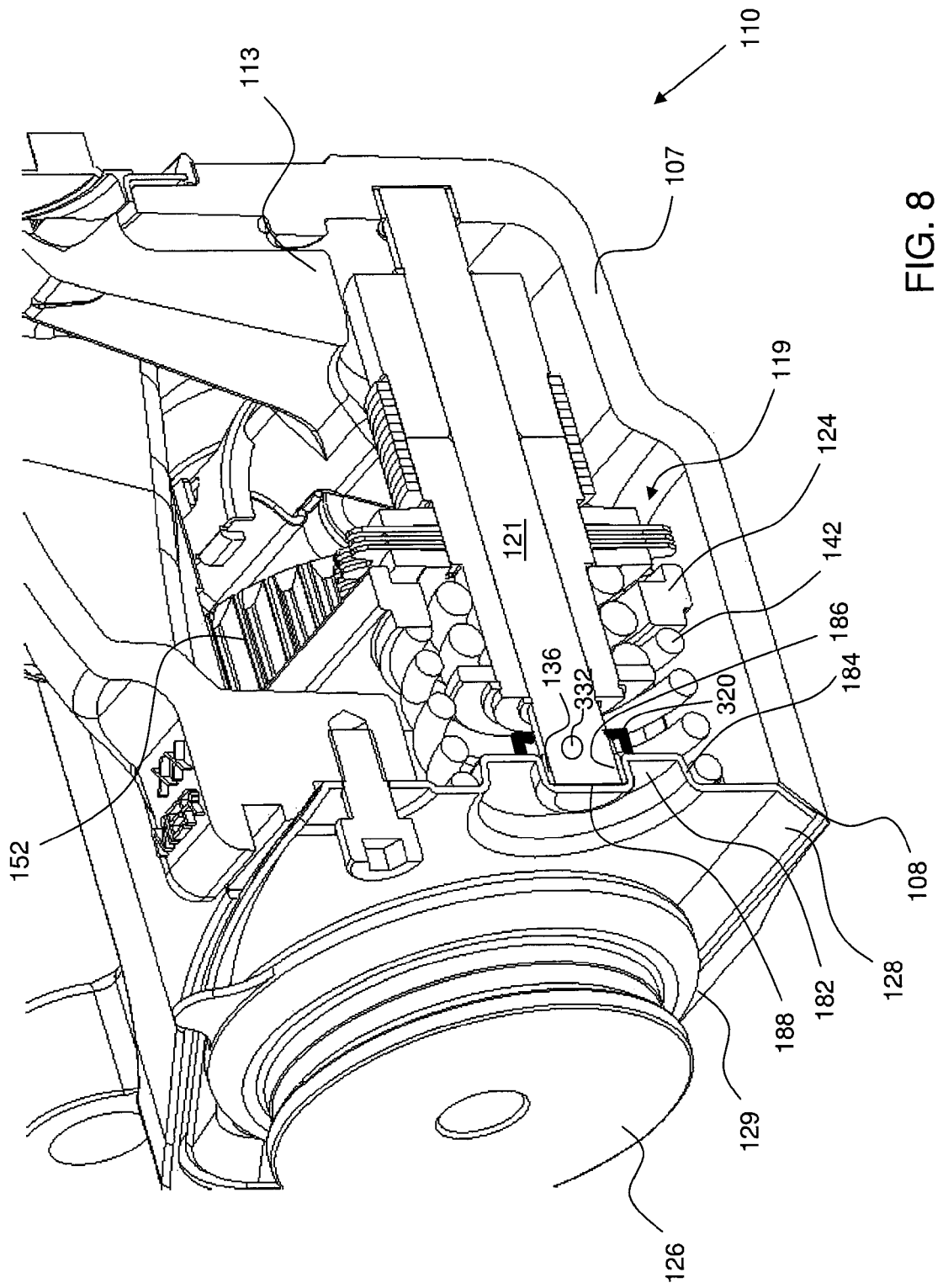
FIG. 8 is a further vertical cross-sectional view of a brake caliper incorporating a cover plate of FIG. 6.

With reference to FIG. 8, a further bearing form 182 is used to mount a wear adjuster shaft 21 of the wear adjuster assembly 119. This bearing form 182 also positions the return spring 142 on the cover plate 128. In this embodiment a bushing 136 is provided between the form and the shaft 121, as this is subjected to a greater amount of rotation than the de-adjuster mechanism.

In a preferred embodiment the peripheral lips 176 provide a surface that is directly overmoulded by the piston seals 129. Additionally, a peripheral seal (not shown) is overmoulded directly to the perimeter of the cover plate 128 in preferred embodiments. Furthermore, the cover plate 128 is mounted to the housing 107 in a preloaded state using bolts 190. This is made possible by virtue of an angled peripheral edge 134 on the cover plate that may be resiliently deflected. By preloading the cover plate an effective seal may be maintained if the housing deflects under extreme load to prevent ingress of contaminants into the housing. This may in turn enable a lighter-weight housing to be utilised. In alternative embodiments, the cover plate may be bonded directly to the housing using e.g. adhesive, spot welding, riveting or staking.

FIGS. 9 to 13 show certain components of a further embodiment of a vehicle brake assembly 200 where component that fulfil substantially the same function as those of brake assembly 100 are labelled 100 greater.

Figure 13:
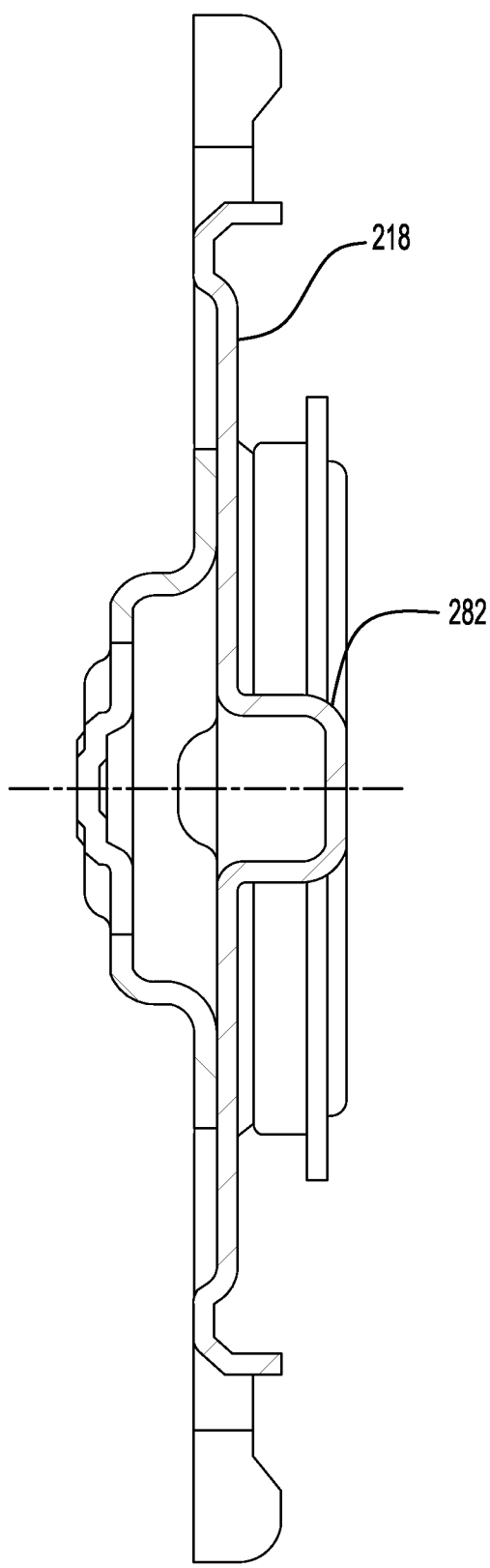
FIG. 13 shows a cross-section view of the cover plate and bayonet plate of FIG. 9.

FIG. 13 shows a cross-section of the cover plate 228 taken at the bearing form 282. Positioned adjacent the bearing form 282 is a bayonet plate 320, best seen in isolation in FIGS. 11 and 12. The bayonet plate includes a generally circular hole 322 having diametrically opposed radially orientated slots 324 and 325. Bayonet plate 320 is generally circular in plan view with two arcuate flanges 326 and 327. Orientated at 90 degrees to slots 324 and 325 are pin abutment regions 328 and 329. As can be seen from FIG. 12, arcuate flanges 326 and 327 define a plane and the pin abutment regions 328 and 329 are spaced further from the plane defined by arcuate flanges 326 and 327 than slots 324 and 325. The bayonet plate 320 is spot welded or otherwise fixed to the cover plate 228.

The wear adjuster shaft 221 of the wear adjuster assembly 219 includes a cross hole 330 (see FIG. 10) through which is fitted a cross pin 332. Cross pin 332 is longer than the length of cross hole 330 and projects evenly each side of the wear adjuster shaft 221. The length of the cross pin 332 is such that the end of the wear adjusting shaft 221 can be inserted through hole 322 and the cross pin, when mounted in the cross hole can also be inserted through the slots 324 and 325. Once the end of shaft 221 and the cross pin has been inserted into the space between the bayonet plate 320 and the bearing form 282, the shaft can be turned through 90 degrees and the pin will be biased into engagement with the pin abutment regions 328 and 329 as will be further described below. In this manner the wear adjuster shaft 221 can be attached in a bayonet style connection to plate 228.

Figure 9:
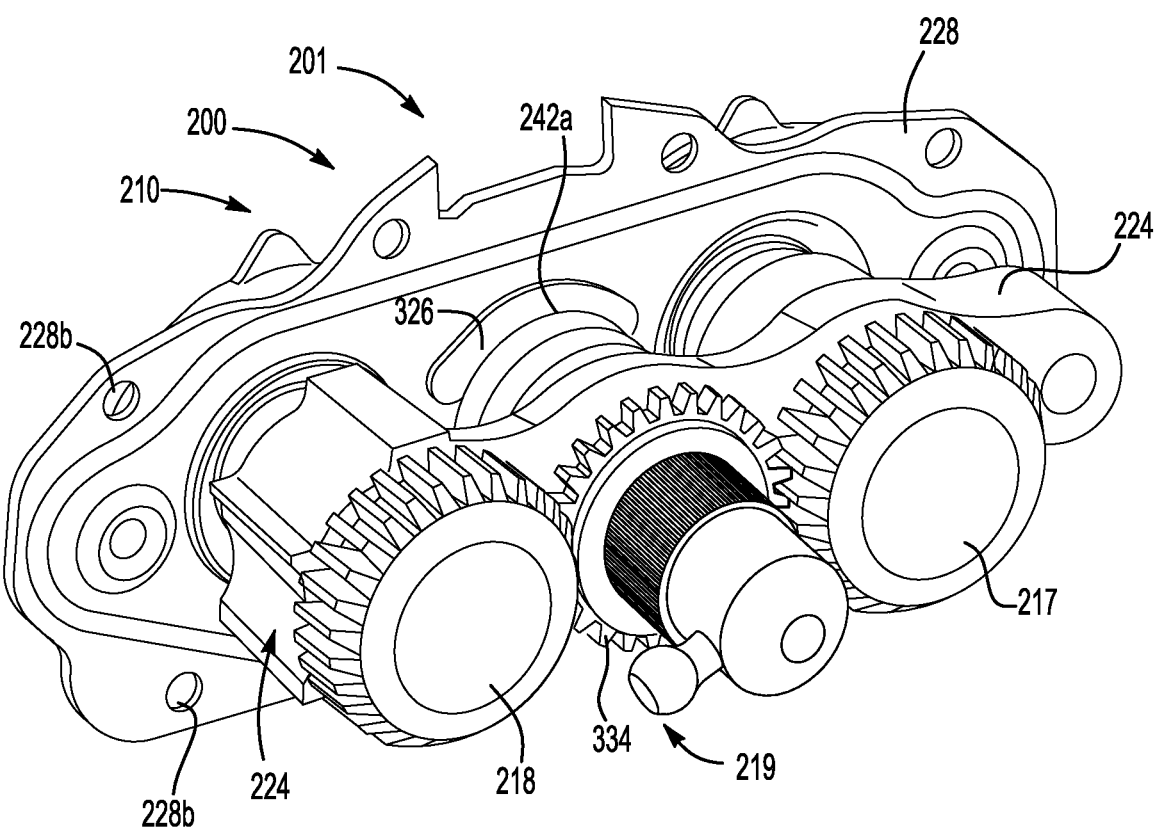
FIG. 9 shows a subassembly for a disc brake according to the present invention.

In more detail by using this type connection a sub assembly of the components shown in FIG. 9 can easily be assembled. The major components shown in FIG. 9 are the cover plate 228, the piston assembly 217 and 218, the adjuster assembly 219 and the yoke 224. As can be seen from FIG. 10, the shaft 221 has an enlarged head 221A at one end and this enlarged head retains other components of the adjuster assembly 119 such as gear assembly 334, spring 336, shaft 338 and wrap spring 340. The adjuster assembly 119 operates in a manner as described in EP2538104, and therefore will not be further described herein.

Figure 10:
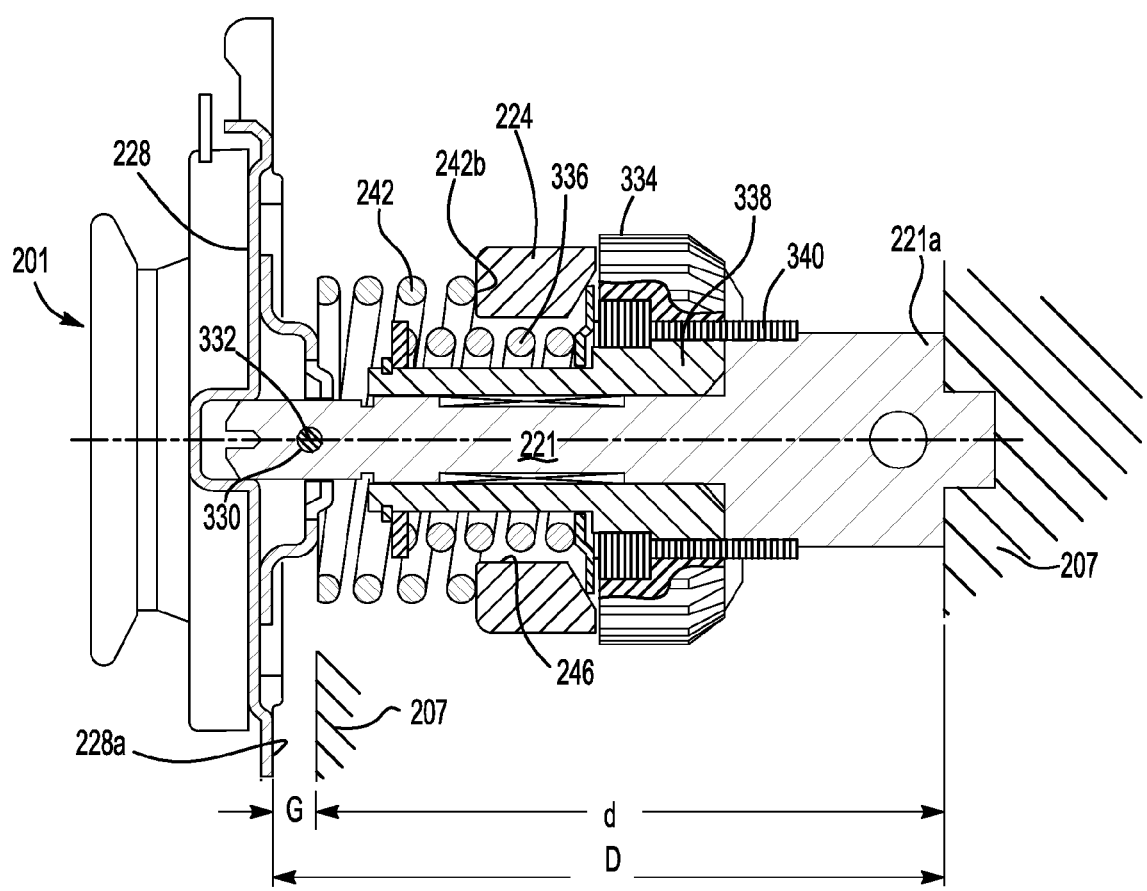
FIG. 10 shows a cross-section view of FIG. 9.
Figure 11:
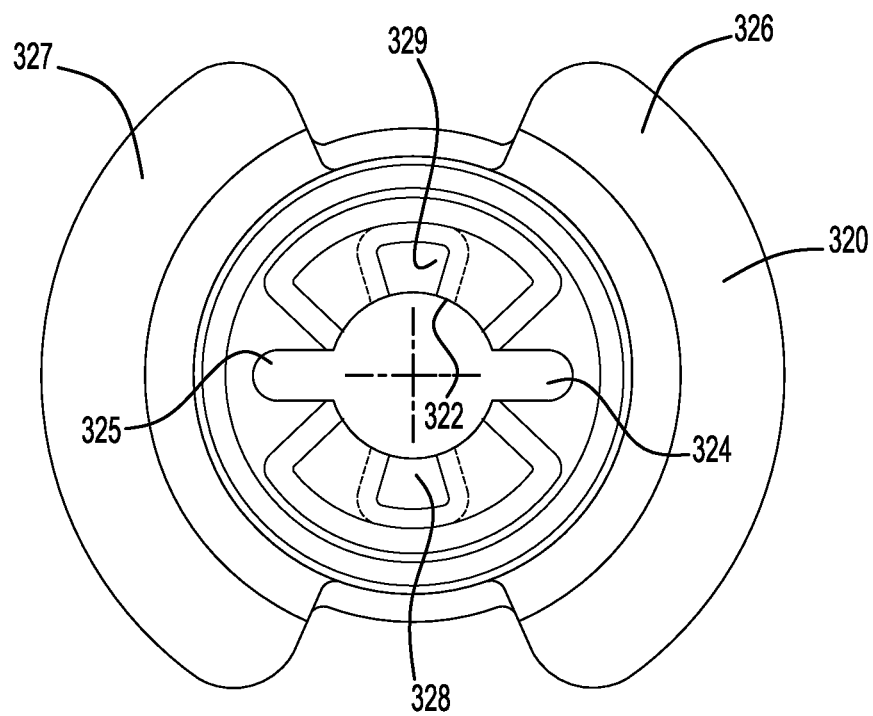
FIG. 11 shows a bayonet plate of FIG. 9.
Figure 12:
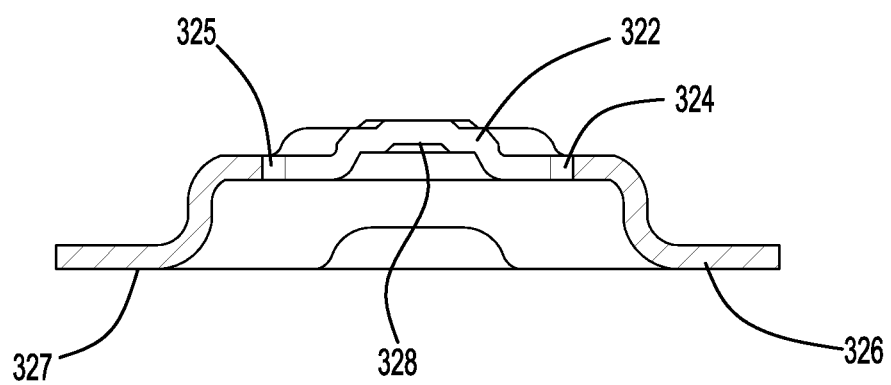
FIG. 12 shows a cross-section view of the bayonet plate of FIG. 11.

The aperture 246 (see FIG. 3 for view of equivalent aperture 146) of the yoke 224 surrounds spring 336 and sits to the left of gear assembly 334 and to the right of the cover plate 228 when viewing FIG. 10. Accordingly, the yoke forms part of the sub assembly 201 since it is retained in place by the gear assembly 334 which in turn is retained in place by shaft 221 being attached to the cover plate 228 by the bayonet attachment described above.

Figure 2:
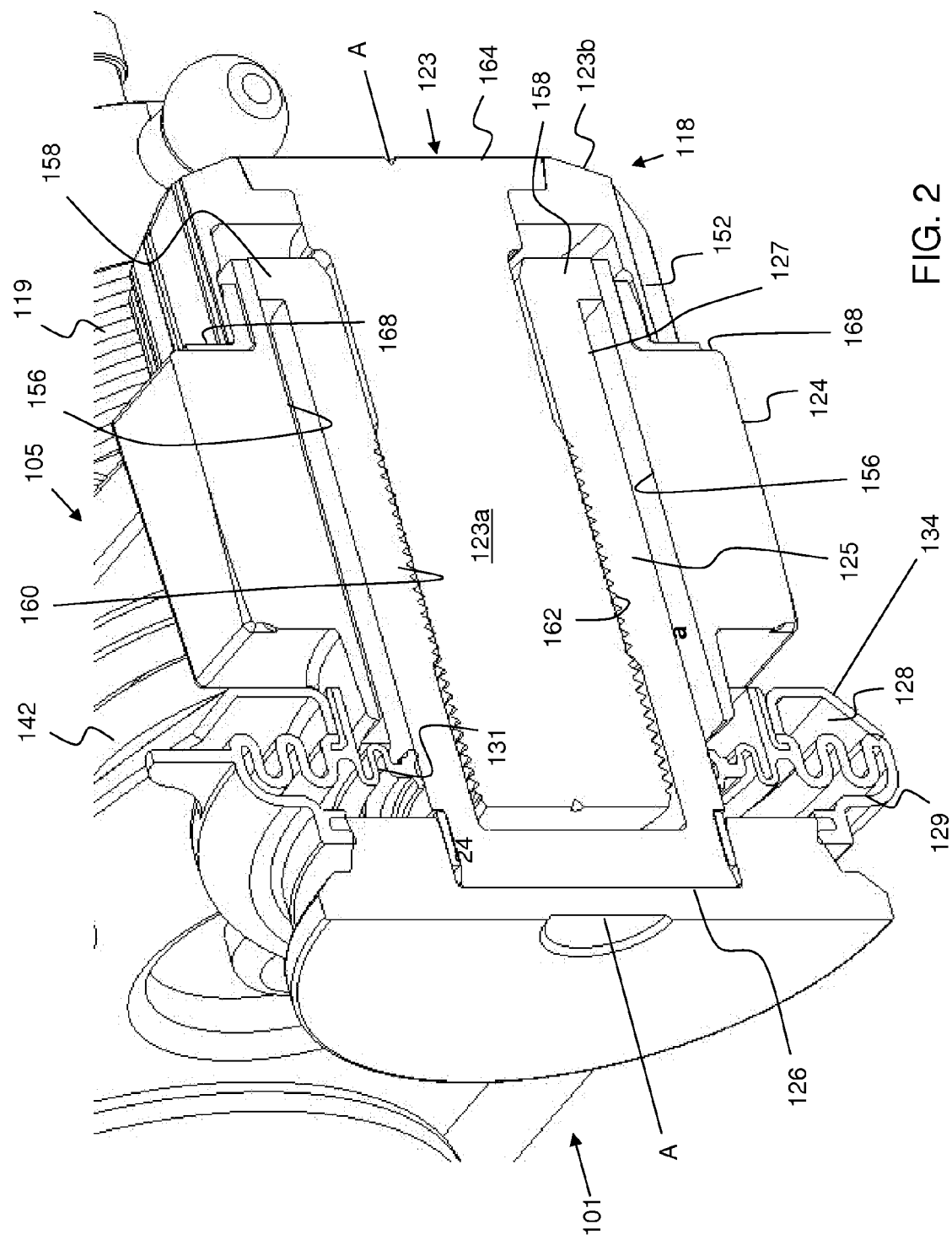
FIG. 2 is a vertical cross-section through a force transmission device (or actuator assembly) according to an embodiment of the present invention.
Figure 3:
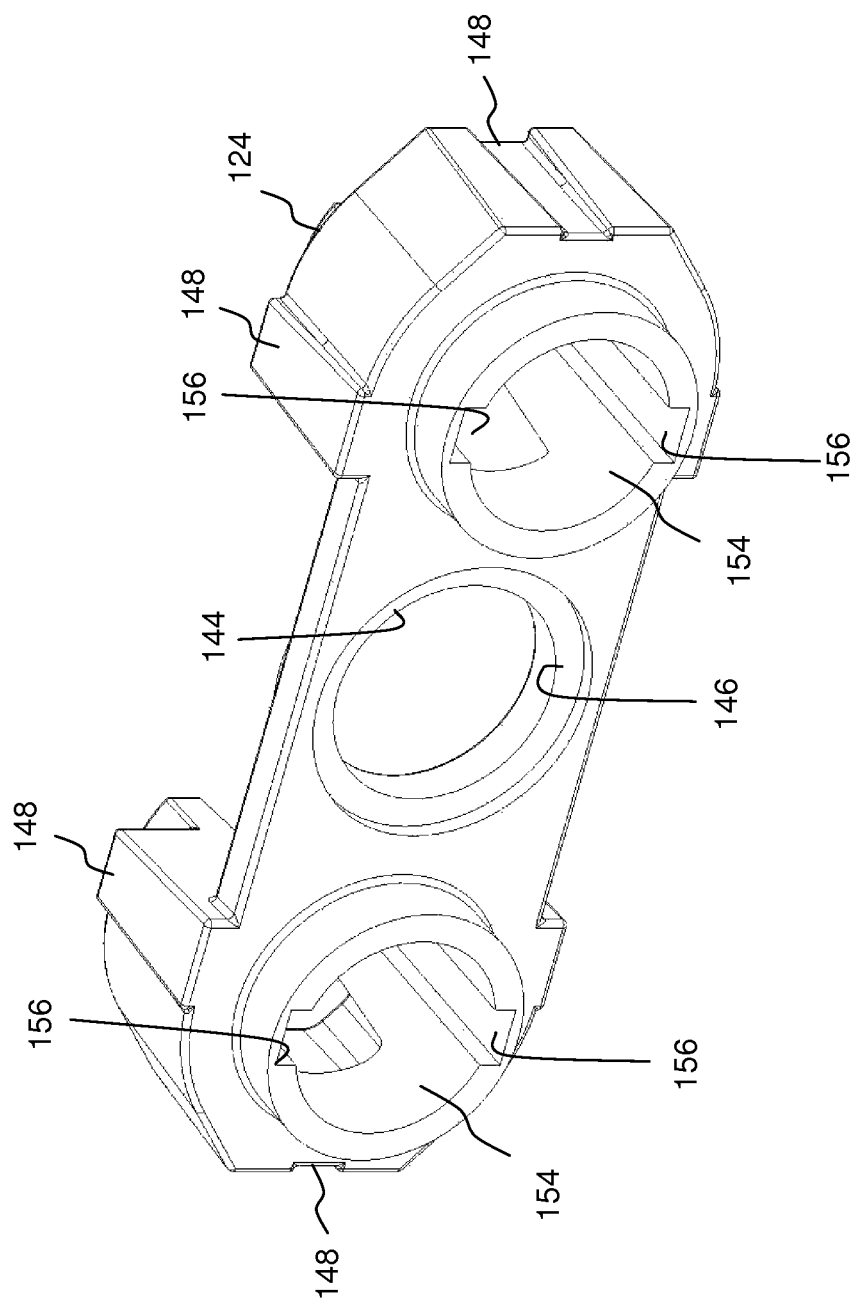
FIG. 3 is an isometric view of a yoke portion of the force transmission device (or actuator assembly) of FIG. 2.
Figure 4:
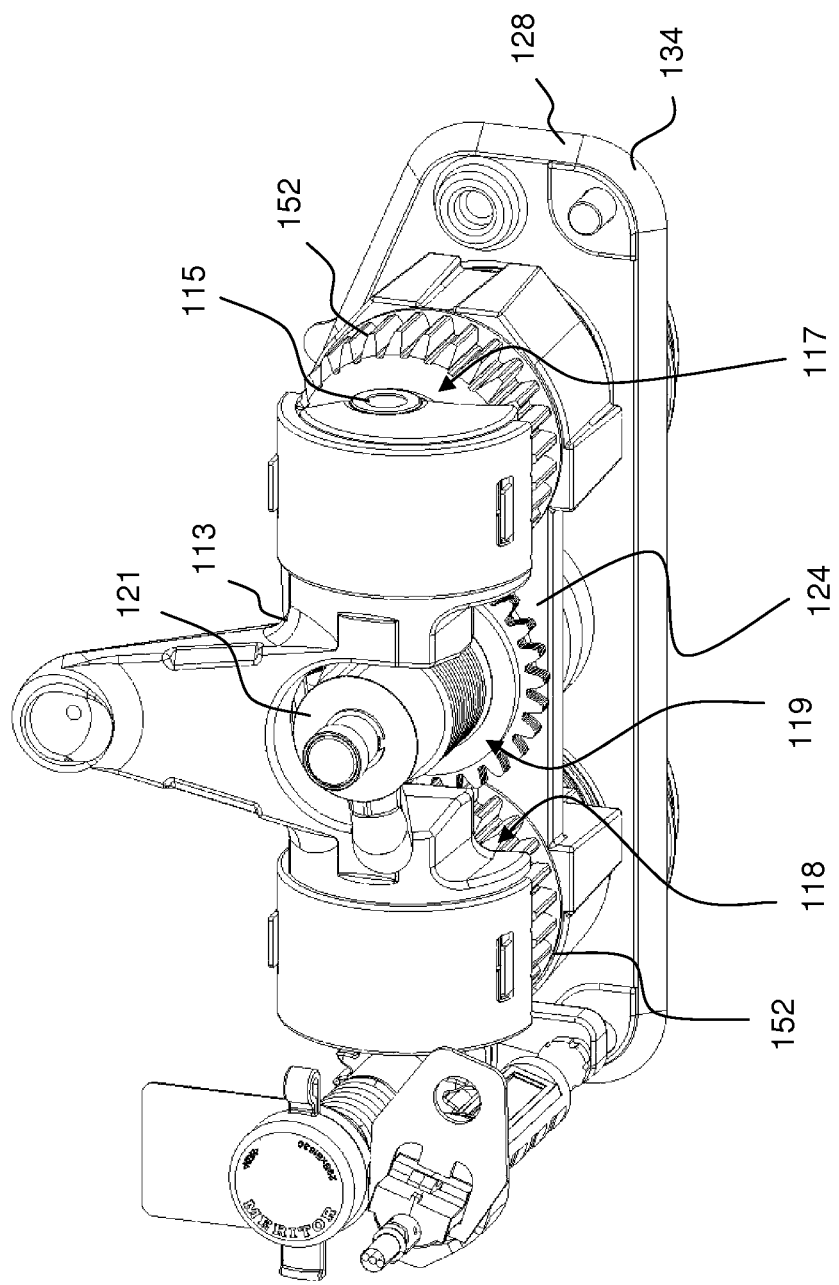
FIG. 4 is a perspective view of an assembly including the force transmission device (or actuator assembly) of FIG. 2, an operating shaft and a cover plate.
Figure 5:
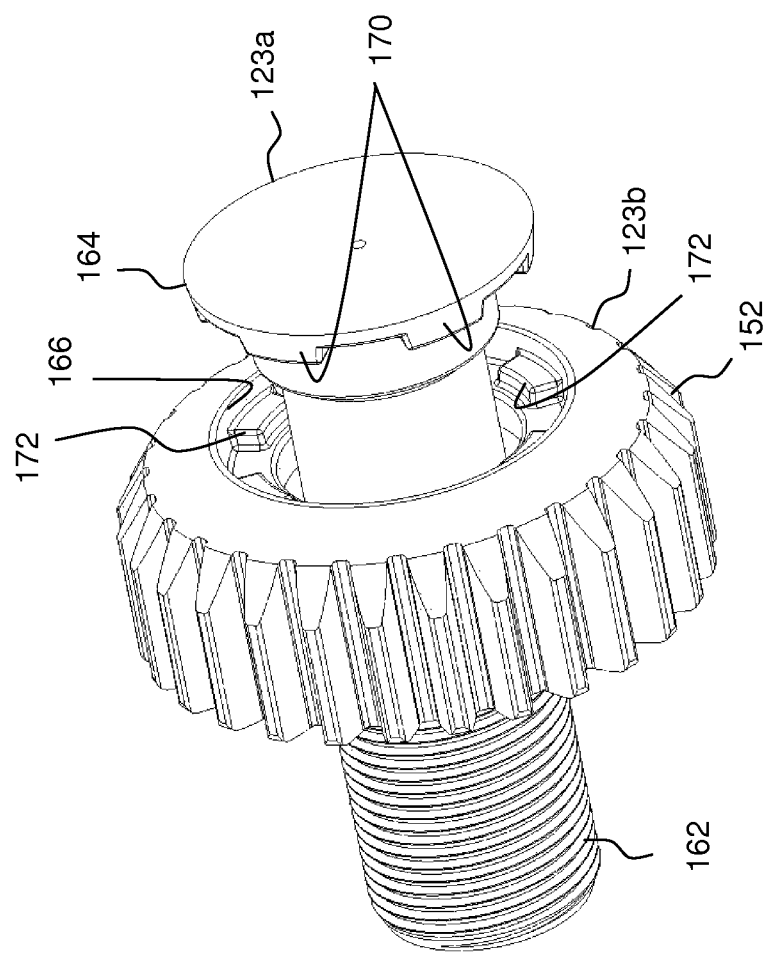
FIG. 5 is an exploded perspective view of an inner tappet portion of the force transmission device (or actuator assembly) of FIG. 2 in accordance with an embodiment of the present invention.

As best seen in FIG. 2, the inner tappet 123, shaft portion 123A and second piece 123B are coupled by virtue of the thread engagement to piston 125. Since the equivalent components on brake assembly 200 are held in place with the yoke 224, they too form part of the subassembly 201 shown in FIG. 9.

FIG. 10 shows the position of various components of the sub assembly 201 prior to being fully assembled into the caliper housing. In particular, opposite ends of the cross pin 332 are in abutment with the associated pin abutment regions 328 and 329. This engagement between the cross pin 332 and the pin abutment regions 328 and 329 is under a load applied by the helical return spring 242.

For ease of explanation helical return spring 242 as shown in FIG. 10 is positioned as if the sub assembly 201 was fully assembled into the associated housing. As a sub assembly, prior to fitting into the housing the end 242A (see FIG. 9) of the helical return spring 242 is in engagement with the arcuate flange 326 of the bayonet plate. As mentioned above, the bayonet plate is welded or otherwise fixed to the cover plate 228. Because spring 242 is a compression spring and because when assembled into the subassembly 201 prior to assembly into the housing the spring is under compression, then end 242A of the spring tends to bias the cover plate 228 away from end 242B of the spring which is in engagement with the yoke 224. Thus, as a sub assembly 201 the yoke is biased away from the cover plate by spring 242.

As mentioned above, the yoke is held in place by the gear assembly 343 which is attached to the shaft 338 which surrounds shaft 221. This means that the spring 242 biases the shaft 221 to the right when viewing FIG. 1 and it is this spring biasing that forces the cross pin 332 to the in engagement with the adjacent pin abutment regions 328 and 329.

FIG. 10 shows schematically parts of the housing 207. End 221A has been fitted into a recess of the housing 207, however the subassembly 201 has not been finally assembled into the housing. Thus, the sub assembly 201 as initially inserted into the housing 207 has a distance D between a shoulder of the end 221A of the shaft 221 and a portion of the cover plate 228. FIG. 10 shows the relative position of the housing 207 and it can be seen that there is a distance d between the shoulder of housing 207 against which ends 221A abuts and a flange of housing 207 against which portion 228A of cover plate 228 will abut once the brake has been finally assembled. Thus, when the subassembly 201 is initially inserted into the housing 207 a gap G exists between the cover plate 228 and the adjacent housing 207. Bolts are then passed through holes 228B and sequentially tightened and in doing so gap G is closed as the cover plate 228 moves to the right when viewing FIG. 10. As the cover plate 228 moves to the right it compresses spring 242, and, as shown in FIG. 10, the end 242A of spring 242 is shown in the position it would be in when the brake caliper 210 is fully assembled and the bolts passing through holes 228B are all fully tightened. As can be seen, as the cover plate 228 moves to the right when viewing FIG. 10 it will be appreciated that shaft 221 does not move. Accordingly, as the bolts are tightened and the bayonet plate moves to the right as the cover plate moves to the right then the cross pin 232 disengages from the pin abutment regions 328 and 329. Accordingly, the bayonet plate 320 and cross pin 332 serve as an assembly aid, and once the brake caliper has been assembled they serve no further substantive purpose. In particular spring 242 is a relatively strong spring and because it is under tension once the sub assembly 201 has been assembled, then this spring tends to keep all the components shown in FIG. 9 relatively rigid relative to each other. As such, the components shown in FIG. 9 tend not to "flop around" relative to each other. This is particularly useful since as the sub assembly is assembled into the housing, the operator carrying out the assembly process progressively loses access to components that will be contained within the housing as the cover plate progressively approaches the flange of the housing against which it is bolted. Because the assembler loses access to the internal components they cannot be readily manoeuvred into position due to the lack of access, but nevertheless because they are being held relatively rigidly relative to each other by virtue of the spring 242 the assembler can, by manoeuvring the cover plate 228, also manoeuvre the other components of the subassembly so that they can be correctly assembled and their shafts can be aligned and fitted into various holes etc.

Similarly, in the event that it is necessary to carry out maintenance on the brake caliper, the bayonet attachment allows easily withdrawal of the components of the subassembly simply by lifting the cover of the housing.

The brake caliper 110 also includes a cross pin 332 and bayonet plate 320 but these have only been shown schematically in FIG. 8. Accordingly, the brake caliper 110 includes a bayonet type attachment of the shaft 121 to the cover plate 128 which operates substantially the same as those components of brake caliper 210.

Figure 14:
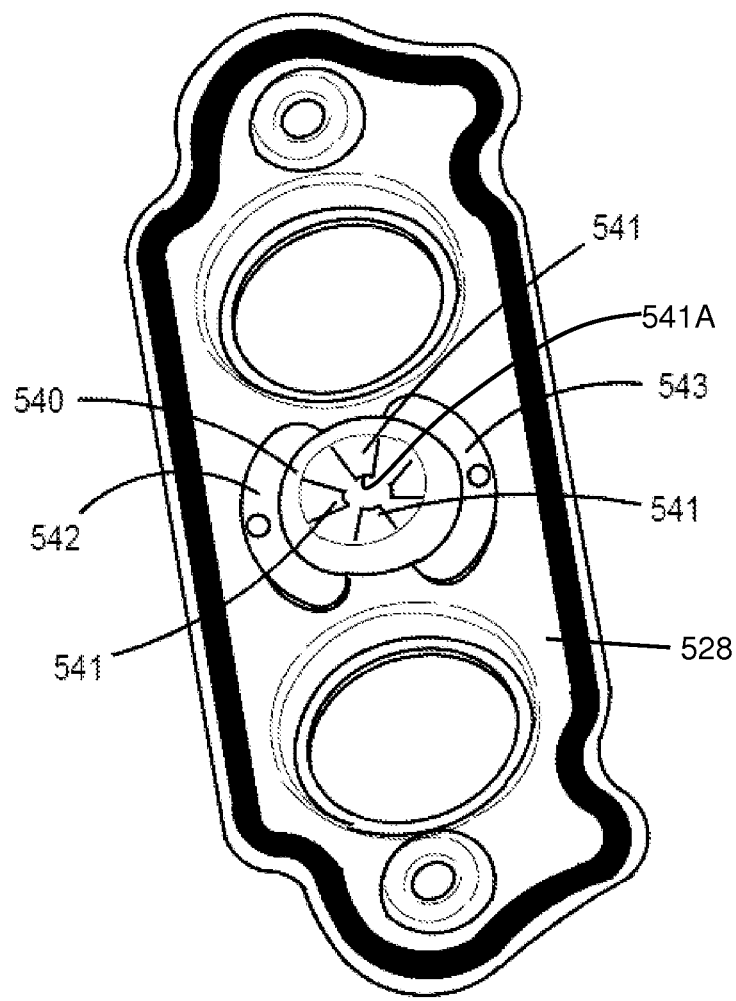
FIG. 14 shows a cover plate for a further embodiment of a vehicle brake assembly according to the present invention.
Figure 15:
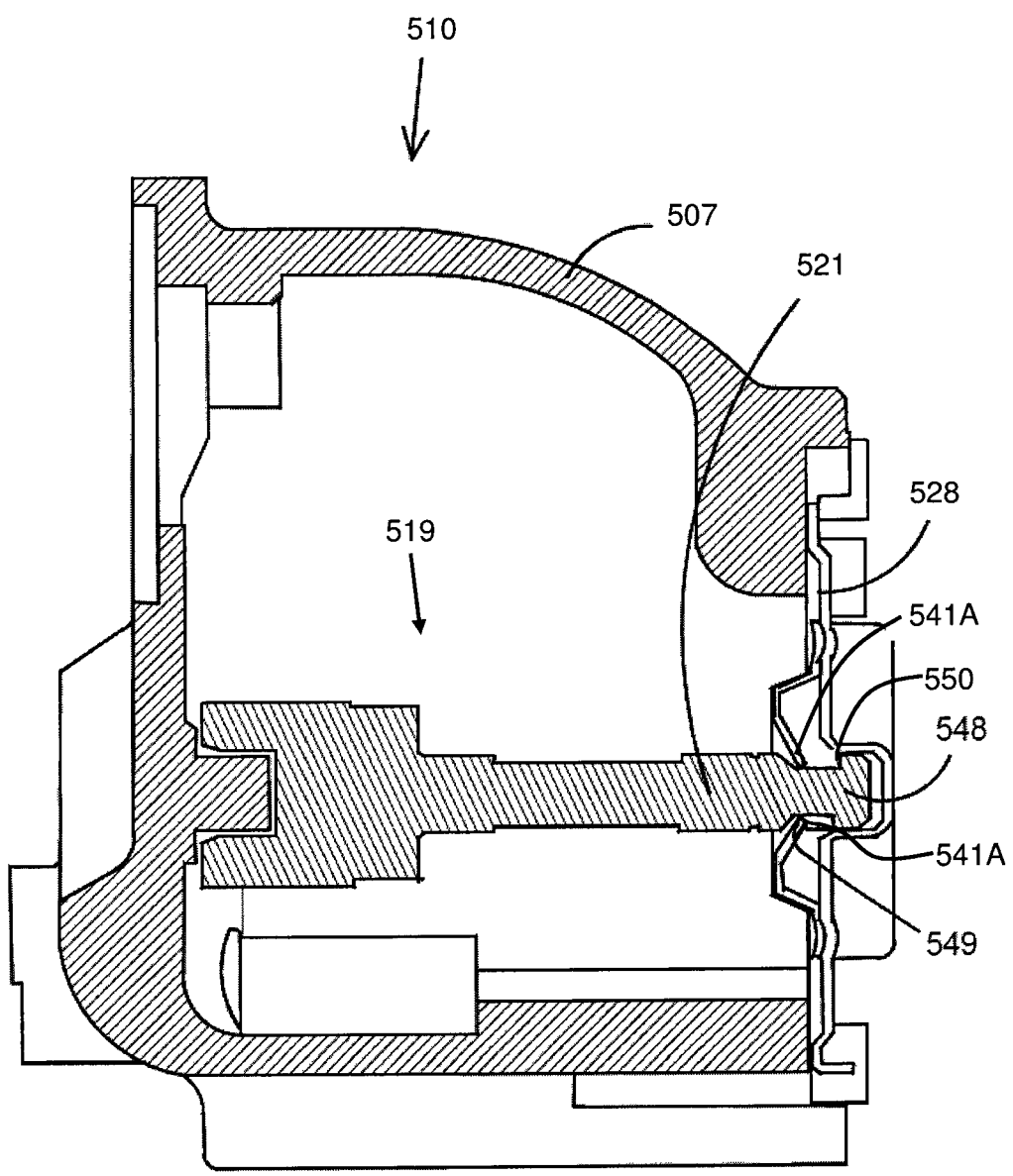
FIG. 15 shows the vehicle brake assembly used with a cover plate of FIG. 14.

With reference to FIGS. 14 and 15 there is shown a further embodiment of a brake caliper 510. Brake caliper 510 operates in a similar manner to brake caliper 210. Accordingly, for ease of explanation not all components of brake caliper 510 are shown. As shown in FIG. 15 brake caliper 510 includes a housing 507, a cover plate 228, and adjuster assembly 519 (only a part of which is shown but which includes an adjuster shaft 521). In this case adjuster shaft 521 does not include the cross pin 332 of brake caliper 210, rather it includes a circular groove 549.

With reference to FIG. 14 the cover plate 528 does not include the bayonet plate 320 of cover plate 228, rather it includes a spring clip plate 540 being generally circular and having four inwardly projecting fingers 541 each having an end 541A. The spring clip 540 is spot welded to cover plate 528 at arcuate flanges 542 and 543. The groove 549 in conjunction with the inwardly projecting fingers 541 provide a snap fit connection between shaft 521 and the cover plate 528.

Thus, a sub assembly (not shown) similar to sub assembly 201 can be provided by snap fitting the end of shaft 521 into the spring clip plate 540. Once the sub assembly has been made it can then be inserted into the housing 507 and in particular it can be seen in FIG. 15 that the ends 541A are spaced apart from the right hand edge 550 of groove 549. It will be appreciated that the subassembly, prior to assembling into housing 507, the ends 541A will be in engagement with edge 550 by virtue of the return spring (not shown but the equivalent of spring 142) biasing the shaft 521 away from the cover plate 528. However, once the subassembly has been assembled into the housing as shown in FIG. 15 the cover plate will move relative to the shaft 521 such that ends 541A no longer engage edge 550 and are therefore spaced apart from edge 550. Accordingly, once fully assembled, the spring clip plate 540 plays no further substantial part in the operation of the brake caliper 510.

The configuration of the spring clip plate 540 in conjunction with groove 549 and head 548 of shaft 521 is such that in order to disassemble the subassembly for maintenance purposes or the like the inwardly projecting fingers 541 will plastically deform, since it is not possible to disassemble the subassembly without bending the inwardly projecting fingers 541 to the left when viewing FIG. 15. Thus, in disassembling the subassembly the cover plate 520 is rendered unusable. This helps to prevent servicing of a subassembly by unqualified operators.

As will be appreciated, the adjuster shaft 521 is fixed to the cover plate 528 by a spring clip arrangement in the form of spring clip plate 540. Similarly, the adjuster shaft 221 is fixed to the cover plate 228 by a spring clip arrangement in the form of a combination of spring 242, bayonet plate 320 and cross pin 332.

Numerous changes may be made within the scope of the present invention. For example, the force transmission device may comprise a single piston, a different form of actuating member may be used, and e.g. electromechanical actuation used in place of air actuation. An electrical adjuster assembly may be used in place of the mechanical one illustrated. As mentioned above, sub assembly 201 includes various components. However, in further embodiments the sub assembly may only include a cover plate and the adjuster assembly. In further embodiments the sub assembly may only include the cover plate, and adjuster assembly and a single piston assembly. In a further embodiment the subassembly may include the cover plate and an adjuster assembly and two or more piston assemblies. In a further embodiment the sub assembly may include a cover plate, an adjuster assembly and a yoke. The yoke may be arranged to receive a single piston assembly or may be arranged to receive two or more piston assemblies. The single piston assembly or the two or more piston assemblies may be slidable relative to the yoke. The subassembly may include a bias device that biases the adjuster shaft away from the cover plate prior to assembly of the subassembly into the housing. The piston may be attached to the cover plate by virtue of it being attached to any other component which is attached to the cover plate. Whilst the piston may be attached to the cover plate, it may nevertheless be slideable relative to the cover plate.

The ends 541A of the spring fingers 541 define clip feature which engage with edge 550 of groove 549 once the subassembly has been assembled and prior to assembly into the housing. The edge 550 defines shaft features. As explained above, the clip features (541A) move away from the shaft features (550) once the cover is secured finally in the housing. Similarly, the pin abutment regions 328 and 329 define clip features which move away from shaft features (i.e. cross pin 332) when the subassembly is finally assembled into the housing.

While exemplary embodiments are described above, it is not intended that these embodiments describe all possible forms of the invention. Rather, the words used in the specification are words of description rather than limitation, and it is understood that various changes may be made without departing from the spirit and scope of the invention. Additionally, the features of various implementing embodiments may be combined to form further embodiments of the invention.

What is claimed is:

1. A vehicle brake assembly comprising:
a brake caliper defining a caliper housing and defining a plane of rotation of a brake disc, the caliper housing having an opening facing the plane of rotation;
a cover plate for closing the opening;
an actuator assembly at least partially mounted in the caliper housing, wherein the actuator assembly includes at least one piston for moving a friction element; and
an adjuster mechanism for adjusting an effective length of the at least one piston, the adjuster mechanism including an adjuster shaft, the adjuster shaft being fixed to the cover plate by a clip arrangement.

2. A vehicle brake assembly as defined in claim 1 wherein the clip arrangement includes one or more spring fingers secured to the cover plate, the spring fingers being received in a recess on the adjuster shaft.

3. A vehicle brake assembly as defined in claim 2 including a bias device for biasing the adjuster shaft away from the cover plate.

4. A vehicle brake assembly as defined in claim 1 wherein the clip arrangement includes a bayonet fitting suitable for fixing the adjuster shaft to the cover plate.

5. A vehicle brake assembly as defined in claim 4 wherein the clip arrangement includes a bias device for biasing the adjuster shaft away from the cover plate.

6. A method of assembling a vehicle brake assembly comprising:
providing a brake caliper defining a caliper housing and defining a plane of rotation for a brake disc, the caliper housing having an opening facing the plane of rotation;
providing a cover plate for closing the opening;
providing at least one piston for moving a friction element that is adapted to contact the brake disc;
providing an adjuster mechanism for adjusting an effective length of the at least one piston, the adjuster mechanism including an adjuster shaft;
providing a clip arrangement;
providing a bias device;
providing a subassembly by fixing the adjuster mechanism to the cover plate via the clip arrangement such that the bias device biases the adjuster shaft away from the cover plate and the adjuster shaft is prevented from moving away from the cover plate by the clip arrangement and attaching the at least one piston to the cover plate, the at least one piston and the adjuster mechanism at least partially defining an actuator arrangement, the subassembly being provided remotely from the caliper housing; and
subsequently assembling the subassembly to the caliper housing such that the actuator arrangement is at least partially mounted in the caliper housing and the opening is closed by the cover plate and the cover plate is secured to the caliper housing.

7. A method of claim 6 wherein the step of subsequently assembling the subassembly to the caliper housing causes the adjuster shaft to move relative to the cover plate.

8. A method of claim 6 wherein, in the subassembly, clip features of the clip arrangement engage shaft features of the adjuster shaft to prevent the adjuster shaft from moving away from the cover plate, and
   wherein the step of subsequently assembling the subassembly to the caliper housing causes the clip features to move away from the shaft features.

9. A method of claim 6 wherein the clip arrangement includes one or more spring fingers secured to the cover plate, the spring fingers being received in a recess on the adjuster shaft.

10. A method of claim 6 wherein the clip arrangement includes a bayonet fitting suitable for fixing the adjuster shaft to the cover plate.

11. A method of claim 6 wherein the step of providing the subassembly includes attaching a yoke to the cover plate, the at least one piston being slideable relative to the yoke.

* * * * *